No. 802,258. PATENTED OCT. 17, 1905.
M. J. BENDER.
SLEEVE FASTENER.
APPLICATION FILED MAY 23, 1904.
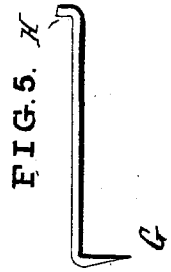
FIG. 5.
FIG. 6.
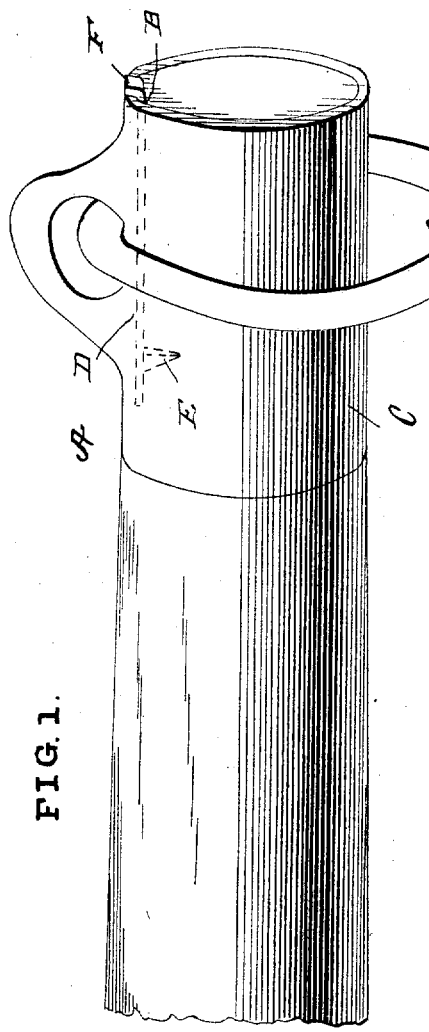
FIG. 1.
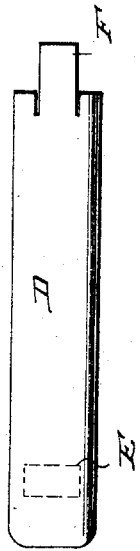
FIG. 2.
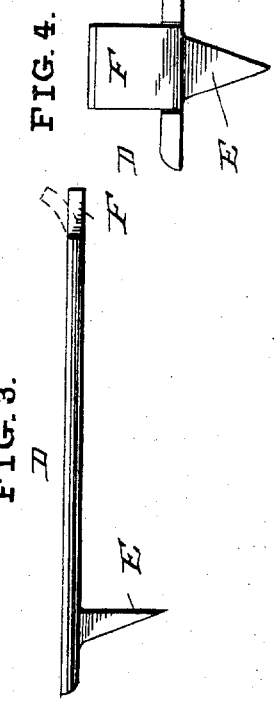
FIG. 4.
FIG. 3.
WITNESSES:
Chas. K. Davis.
J. E. Little.
INVENTOR
Martin J. Bender
BY Claude L. McKesson
Attorney.

UNITED STATES PATENT OFFICE.

MARTIN J. BENDER, OF COLORADO SPRINGS, COLORADO.

SLEEVE-FASTENER.

No. 802,258.　　　Specification of Letters Patent.　　　Patented Oct. 17, 1905.

Application filed May 23, 1904. Serial No. 209,269.

*To all whom it may concern:*

Be it known that I, MARTIN J. BENDER, a citizen of the United States, residing at Colorado Springs, in the county of El Paso and State of Colorado, have invented new and useful Improvements in Metal Clip or Sleeve Fasteners, of which the following is a specification.

My invention relates to improvements in metal clip or sleeve fasteners, such as are employed upon the ends of vehicle shafts or poles, whiffletrees, or in other places where such a fastener could be employed; and the object of my invention is the provision of a fastener of the simplest, cheapest, and most durable construction which will reliably and permanently secure the clip or sleeve in place and absolutely prevent accidental detachment or loosening from continual use.

With this object in view my invention consists of a clip or sleeve fastener embodying novel features of construction, combination, and adaptation of parts for service substantially as disclosed herein.

Referring to the accompanying drawings, Figure 1 represents a side view of an end of a whiffletree with my fastener applied to secure the usual clip or sleeve for the purpose of showing the application of my fastener. Figs. 2 and 3 represent, respectively, a top plan and side view of the fastener detached. Fig. 4 represents a front end view of the fastener; and Figs. 5 and 6 represent, respectively, a side and sectional view of a modified construction of the fastener.

Like characters refer to like parts throughout the several views.

Referring to the details of construction, A designates the end of the whiffletree, having the groove, channel, or flattened surface B, the said end also being reduced to receive the cap or sleeve C. Fitting in said channel or on said flattened surface is the plate D, provided at or near its inner end with the downward extending or depending barb, prong, or pin E, which is driven in the wood, and at its outer end is provided with the tongue F, which acts as a retainer to engage the edge of the cap or sleeve, as shown at Fig. 1, to secure said sleeve or clip. This tongue is bent upward and bears tightly against the clip or is bent into a notch in said clip adapted to engage it; but the tongue can be forced down, if desired, to permit the removal or detachment of the sleeve; but the fastener cannot work out or become loosened.

In the form of the fastener shown in Fig. 5 the fastener has one end formed or shaped into a fastening-prong G and the other end provided with the tongue or catch H, and in Fig. 6 the fastening prong or barb is struck from the body of the plate, as at J.

I do not desire to limit myself to the exact modifications shown or either of them, as a large variety of different styles and forms might be shown; but in all of them, as in the modifications shown, they should have a prong at or near one end adapted to be driven into the wood, they should extend along the top of the wood and under the sleeve or clip to the outer end, and at the outer end be bent up past the end of the clip in the manner shown.

Having thus described my invention, what I claim as new, and desire to secure by Letters Patent, is—

In a pole-tip fastener the combination with the pole having a groove channeled therein and extending from the end inwardly, a flat plate seated in said groove having an integral depending point struck up from near its inner end and adapted to be driven into the pole, parallel slits in the outer end of the plate forming part of a reduced tongue, said tongue being turned up for engaging and holding the ferrule on the end of the pole.

In testimony whereof I have signed my name to this specification in the presence of two subscribing witnesses.

MARTIN J. BENDER.

Witnesses:
ABNER MOORE,
JOHN E. LITTLE.